United States Patent
Elboim et al.

(10) Patent No.: US 10,782,772 B2
(45) Date of Patent: Sep. 22, 2020

(54) ENERGY-AWARE COMPUTING SYSTEM

(71) Applicant: Wiliot, LTD., Caesarea (IL)

(72) Inventors: Yaron Elboim, Haifa (IL); Dotan Ziv, Tel Aviv (IL); Yuval Amran, Kibutz Mishmarot (IL); Nir Shapira, Raanana (IL)

(73) Assignee: WILIOT, LTD., Caesarea (IL)

( * ) Notice: Subject to any disclaimer, the term of this patent is extended or adjusted under 35 U.S.C. 154(b) by 31 days.

(21) Appl. No.: 16/032,547

(22) Filed: Jul. 11, 2018

(65) Prior Publication Data

US 2019/0018472 A1 Jan. 17, 2019

Related U.S. Application Data

(60) Provisional application No. 62/531,602, filed on Jul. 12, 2017.

(51) Int. Cl.
*G06F 1/329* (2019.01)
*G06F 15/78* (2006.01)
*G06F 1/3296* (2019.01)
*G06F 1/3212* (2019.01)

(52) U.S. Cl.
CPC ............ *G06F 1/329* (2013.01); *G06F 1/3212* (2013.01); *G06F 1/3296* (2013.01); *G06F 15/7807* (2013.01)

(58) Field of Classification Search
CPC combination set(s) only.
See application file for complete search history.

(56) References Cited

U.S. PATENT DOCUMENTS

| 7,120,911 | B1 | 10/2006 | Katayama |
| 7,779,412 | B2* | 8/2010 | Lin ................. G06F 9/4893 703/13 |
| 10,386,827 | B2* | 8/2019 | Enver ............. G05B 19/4184 |
| 2003/0196127 | A1 | 10/2003 | Olsen |
| 2010/0030791 | A1 | 2/2010 | Iverson et al. |
| 2010/0218005 | A1 | 8/2010 | Jain et al. |
| 2011/0275331 | A1* | 11/2011 | Wang .............. H04W 52/146 455/73 |
| 2012/0210325 | A1* | 8/2012 | de Lind van Wijngaarden .......... H04W 52/0258 718/103 |
| 2014/0215236 | A1 | 7/2014 | Heinrich et al. |

(Continued)

FOREIGN PATENT DOCUMENTS

| CN | 102612675 A | 7/2012 |
| WO | 2013123445 A1 | 8/2013 |

OTHER PUBLICATIONS

International Search Report and Written Opinion of International Searching Authority for PCT/US2018/041596, ISA/RU, Moscow, Russia, dated Nov. 12, 2018.

(Continued)

*Primary Examiner* — Raymond N Phan
(74) *Attorney, Agent, or Firm* — M&B IP Analysts, LLC

(57) ABSTRACT

An energy-aware system, and method thereof are provided. The energy-aware system includes a microcontroller; an energy storage; a plurality of execution functions integrated in a system on chip (SoC); and a scheduler configured to schedule execution of operations based on available energy at the energy storage and energy requires to complete each of the operations.

20 Claims, 4 Drawing Sheets

(56) References Cited

U.S. PATENT DOCUMENTS

| | | | | |
|---|---|---|---|---|
| 2015/0286262 A1* | 10/2015 | Park | ................... | G05D 23/1917 |
| | | | | 713/320 |
| 2016/0054780 A1 | 2/2016 | Bodas et al. | | |
| 2017/0068298 A1* | 3/2017 | Mishaeli | ............... | G06F 1/3206 |
| 2018/0063797 A1* | 3/2018 | Thubert | .............. | H04W 52/245 |
| 2019/0129493 A1* | 5/2019 | Li | ......................... | G06F 1/3246 |
| 2019/0173543 A1* | 6/2019 | Ganesan | ................ | H01Q 21/28 |
| 2019/0204900 A1* | 7/2019 | Nair | ...................... | G06F 1/3206 |

OTHER PUBLICATIONS

Calhoun, et al., "Battery-less Internet of Things (IoT) System-on-Chip (SoC)", Robust Lower Power VLSI, University of Virginia, Charlottesville, VA, 2015, url: https://rlpvlsi.ece.virginia.edu/battery-less-internet-things-iot-system-chip-soc-0.

The First Chinese Office Action for Chinese Patent Application No. 2018800349004 dated Jul. 21, 2020, CNIPA, Beijing, China.

\* cited by examiner

ENERGY-AWARE COMPUTING SYSTEM

CROSS-REFERENCE TO RELATED APPLICATIONS

This application claims the benefit of U.S. Provisional Application No. 62/531,602 filed on Jul. 12, 2017, the contains of which are hereby incorporated by reference.

TECHNICAL FIELD

The present disclosure relates generally to power management of computing systems, and more specifically to the availability of adapting computing based on available power.

BACKGROUND

In electronic devices, the power consumption is a function of the processing power. That is, increasing the processing power of a computer system often results in an increase in the power consumed by a computer system. However, for electronic devices, such as internet of things (IoT) devices, it is important to keep the power consumption at a minimum. Low power consumption of electronic devices is critical when the power source is from energy harvesting.

To minimize power consumption of such devices, available solutions typically offer providing multiple processors or "execution functions" in a single device, each of which operates in a different power domain. Computing function may include basic arithmetic gates, logical gates, control units, and/or input/output devices. Some of the computing function may be trigged based on power events or scheduling events to further minimize the power consumption.

Conventional power consumption solutions and the architectures of the electronic devices assume that power may be limited, but is always available. For example, the power source may be a battery. As such, the conventional power consumption solutions are designed to complete a processing task at minimum utilization of power, without considering the power and energy required to perform each processing task. That is, the assumption is that there is always available power to complete a processing task. As such, the conventional power consumption solutions are not designed to consider the available energy at any given time, and in particular before executing a computing task.

In devices that operate at ultra-low power, e.g., IoT devices that are based on energy harvesting, the conventional power consumption solutions may not be viable as energy is not always available and available power to perform a processing task may be sporadic.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed include an energy-aware system comprising: a microcontroller; an energy storage; a plurality of execution functions integrated in a system on chip (SoC); and a scheduler configured to schedule execution of operations based on available energy at the energy storage and energy requires to complete each of the operations.

Certain embodiments disclosed also include a wireless internet of thing (IoT) device, comprising: a radio frequent (RF) transceiver; and an energy-aware system configured to schedule execution of operations based on available energy and energy requires to complete each of the operations.

Certain embodiments disclosed herein also include a method for operating an energy-aware system. The method comprises determining if a current voltage level at an energy storage included in the energy-aware system is higher than a start voltage level; and scheduling an execution of at least one operation, by the energy-aware system, when the operation's start voltage level is lower than the current voltage level.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
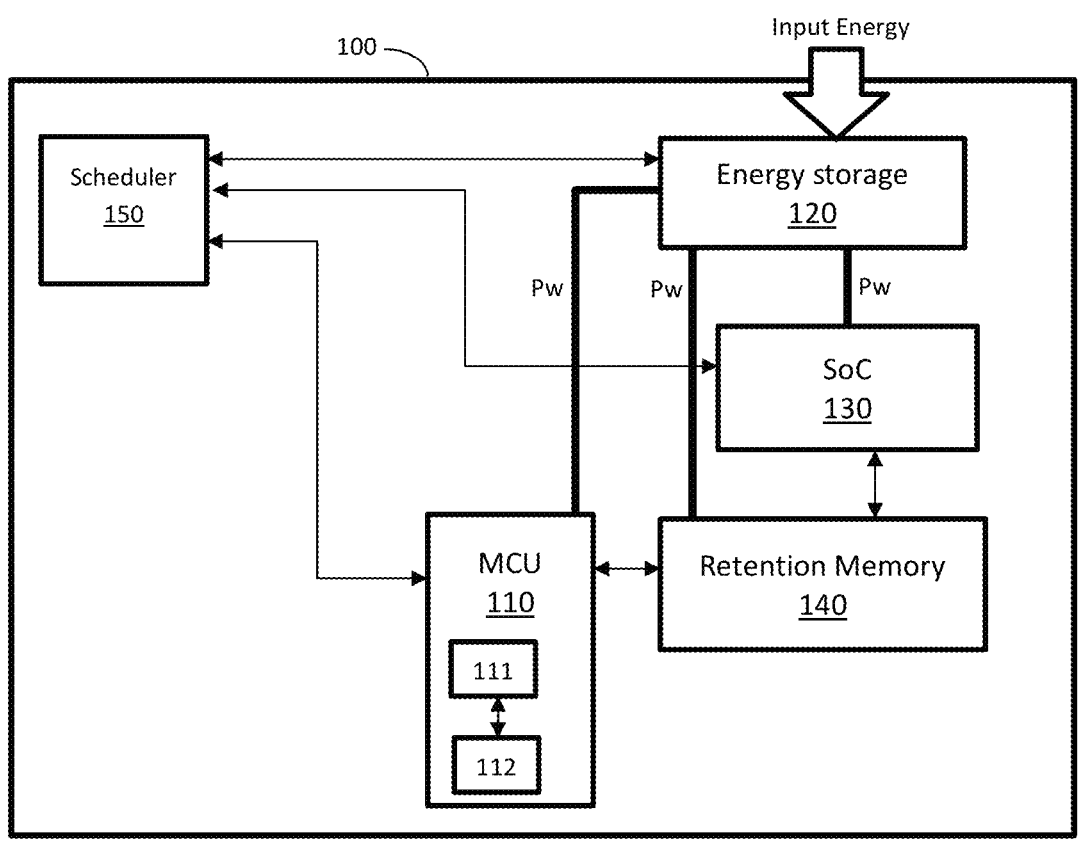
FIG. 1 is a schematic diagram of an energy-aware computing system according to an embodiment.

It is important to note that the embodiments disclosed herein are only examples of the many advantageous uses of the innovative teachings herein. In general, statements made in the specification of the present application do not necessarily limit any of the various embodiments. Moreover, some statements may apply to some inventive features but not to others. In general, unless otherwise indicated, singular elements may be in plural and vice versa with no loss of generality. In the drawings, like numerals refer to like parts through several views.

By way of example of the disclosed embodiments, an energy-aware computing system, and a method thereof are disclosed. In an embodiment, computing operations to be performed by the computing system are scheduled based on currently available power, anticipated future power, or both. The disclosed embodiments may be utilized for in any computing system that operates on ultra-low power. In an example embodiment, such a computing system may include an IoT device having an energy harvester as a power source.

FIG. 1 shows an example schematic diagram of an energy-aware computing system 100 according to an embodiment. The energy-aware computing system 100 includes a microcontroller unit (MCU) 110, an energy storage 120, a system on chip (SoC) 130, a retention memory 140, and a scheduler 150.

The MCU 110 is a small computer on a single integrated circuit (IC). In some configurations, the MCU 110 contains one or more processor cores 111 and a program memory 112. The program memory 112 may be in the form of RAM, flash or ROM. The MCU 110 is configured to execute embedded applications or processes. That is, each of the processor core 111 may carry out the instructions of a computer program, stored in the program memory 112, in order to perform the basic arithmetic, logical, control and input/output (I/O) operations specified by the instructions. Any process carried out by the MCU 110 has a state as described herein, and processes can communicate with each other through interprocess communication (IPC) protocol.

It should be appreciated that a process may be at a 'create' state when loaded from the program memory 112 or retention memory 140. Then, the process is scheduled into a 'wait' state. In this state, the process waits for a context switch and loads the process into the processor core(s) 111. The process's state then changes to a 'run' state, and the processor core(s) 111 execute the process's instructions.

If a process needs to wait for a resource (e.g., wait for a packet reception), it is assigned with a 'blocked' state. The process state is changed back to 'wait' when the process no longer needs to wait (in a blocked state). Once the process finishes execution, or is terminated, the process is removed instantly or is moved into the 'terminated' state.

In an embodiment, the MCU 110 consumes power required to execute one or more instructions of a process from the energy storage 120. The power consumption is limited to only the actual power required to execute a certain process.

The energy storage 120 is charged with energy provided by an energy harvester (not shown). The energy can be harvested from any external sources (or over-the-air signals), such as radio signals, solar power, piezoelectric signals, and the like. The harvested energy is stored in the energy storage 120. The storage 120 may be realized as a capacitor, a battery, an on-die capacitor, and the like. An on-die capacitor is part of the integrated system, i.e., die on which the energy-aware computing system 100 is fabricated. In a semi-conductor fabrication, a die is a small block of semiconductor material, on which a given functional integrated circuit (IC) is fabricated. In an example implementation, the on-die capacitor is a metal capacitor formed using the metal layers as the "metallic plates" and dielectric layers as the dielectric medium of the die.

In an embodiment, the SoC 130 includes a number of execution functions realized as analog circuits, digital circuits, or both. Examples for such execution functions are provided below. The SoC 130 is also configured to carry out processes independently or under the control of the MCU 110. Each process carried out by the SoC 130 also has a state, and processes can communicate with other processes through an IPC protocol. In the configuration illustrated in FIG. 1, the SoC 130 loads the context of processes and read data from the retention memory 140.

In an embodiment, the SoC 130 is partitioned into multiple power domains. Each power domain is a collection of gates powered by the same power and ground supply. To reduce the power consumption, only one power domain is turn on during execution.

Following are non-limiting example execution functions that may be implemented by the SoC 130. A sequencer that can read from and write to memory, e.g., of peripherals and can execute simple logic operations. An asynchronous combinatorial logic for tracking power level of the SoC 130.

Accelerators may be utilized to generate and prepare data packets for transmission. This may include CRC generation, packet whitening, an encryption/decryption engine, and a random number generator.

Digital logic for converting data from parallel to serial and staging the packet bits to the analog transmitter path for transmission. This function may also include calibration logic, e.g., FLL calibration.

It should be noted that the SoC's 130 functions discussed above are only examples, and other or different functions can be implemented by the SoC 130. The disclosed embodiments required multiple power domains in the SoC 130, where at each execution cycle only one power domain is on.

The retention memory 140 is a centralized area in the system 100 that is constantly powered. In an embodiment, data meant to be retained during low power states are located in the retention memory 140. In an embodiment, the retention area is optimized to subthreshold or near threshold voltage, e.g., 0.3V-0.4V. This allows for the reduction the leakage of the retention cells.

According to the disclosed embodiments, a process executed by the MCU 110 or the SoC 130 can load its state (or context) from the retention memory 140. Further, a process executed by the MCU 110 or the SoC 130 can load its state (or context) and can write its context or processed data in the retention memory 140. Always powering the retention memory 140 ensures that data is retained, even in the event the other components of the system 100 are powered off. The retention memory 140 can be realized using flip-flop, latches, or SRAM optimized for minimized power leakage.

In an example embodiment, the retention memory 140 is divided into retention domains (banks). Each such retention domain contains only needed values kept in retention cells (e.g., latches). The partitioning allows for banks to be powered on per configuration. Further, the logic of writing into the banks is power gated to minimize any overall power leakage.

In an example embodiment, the retention banks contain the following types of retention data: software retention maintaining static calibration and information needed for the full flow execution; hardware retention maintaining dynamic parameters temporary variables, and data packet to retain until data transmission; and MCU retention to maintain data utilized by the MCU 110. It should be noted that the retention memory 140 may not be divided into retention banks, or can be divided to any number of banks, without departing from the scope of the disclosed embodiments.

The energy-aware computing system's 100 architecture allows executing a portion of a complete processing flow on several subroutines of a process based on the available energy. In an embodiment, before executing a process, or a portion thereof, the available energy at the energy storage 120 is checked to determine if there is an enough available energy to execute and complete the process. If there is sufficient energy, the process or portion thereof is schedule for execution. To this end, the MUC 110 may be configured with energy requirements for each function and operation to be executed. The energy requirements may indicate, for example, an upper bound of energy that would be consumed by the function or operation.

In an embodiment, the check is performed for each computing block in the SoC 130 configured to run a process. This allows to better estimate the power consumption for running a process prior to its execution. As noted above, the computing blocks are operable in different power domains, and during each execution cycle only one such domain is power. The execution cycle is a time period where there is enough energy to complete at least one operation and writes the execution's results (context) to the retention memory.

In another embodiment, the scheduler 150 is configured to automatically save the context of any executed operation to the retention memory 140 when the voltage level at the storage 120 reaches a predefined threshold, e.g., $V_{STOP}$. In the next execution cycle for the same process, its context is retrieved from the retention memory 140, and execution continues from where it stops.

Once a process completes its execution, the results and/or output are written to the retention memory 140, and the MUC 110 and SoC 130 are powered off to enable maximal power saving. However, as noted above, the retention memory 140 always consumes power through static leakage. The energy storage 120 is charged with harvested energy, and a new execution cycle begins when there is sufficient energy. Then, a new process, or portion thereof, is scheduled for execution. Thus, the processing performed by the energy-aware computing system 100 is at the pace of charging the energy storage 120.

It should be noted that a process may be any function, procedure, method, and the like executed either by the MCU 110 or blocks of the SoC 130 configured to perform a certain computing task, a controlling task, and the like. The process may be part of a program, application, and the like. A process may include one or more instructions. In an example implementation, instructions to be executed by the computing system 100 may be divided into one or more atomic operations. The instructions may be part of software, firmware, middleware, microcode, hardware description language, and the such. Instructions may include code (e.g., in source code format, binary code format, executable code format, or any other suitable format of code).

In an embodiment, the scheduling processes or atomic operations for execution in response to the available energy is managed by the scheduler 150. The scheduling may be triggered by trigger signals, examples of which are provided below.

The scheduler 150, in an embodiment, may break a process into multiple atomic operations (or sub-processes), each or which may be executed during a different execution cycle. Pointers to the subsequence atomic operations to be executed are saved in the retention memory 140.

In one embodiment, the scheduler 150 is configured to schedule processes or atomic operations in a specific predefined order. Such an order of execution is determined by the application (e.g., receive or transmit wireless signals). An example of a sequence of operations is provided below.

In one embodiment, the scheduler 150 may be implemented in software, hardware, firmware, or any combination thereof. In one configuration, the operation of the scheduler 150 may be implemented by the MCU 110. In another embodiment, the scheduler 150 may be part of the SoC 130.

In an embodiment, the energy-aware computing system 100 may operate in two different energy-aware modes: an energy segmented software (ESS) mode and an MCU retention mode. The ESS mode allows for a device (e.g., an IoT sensor) implementing the system 100 to operate in an environment with sparser energy available for harvesting. However, such a mode requires power efficient code with a predefined power budget. The MCU retention mode does not require a power budget, but rather the device implementing the system 100 should operate in an environment richer with available energy for harvesting.

Specifically, the energy segmented software (ESS), a process's code is segmented into atomic operations. The atomic operation includes a set of instructions where execution is completed during a single execution cycle. That is, there should enough energy in the storage 120 to complete execute of an atomic operation. In an embodiment, each atomic operation has a known and relatively small energy budget required for its execution and requires a small context, saved in the retention memory 140, to define its initial state.

The MCU retention mode defines an additional and dedicated retention domain which retains the core logical flops (CM0p), core registers, control parameters and temporary parameters. This mode allows for seamlessly powering down the MCU 110 completely when the energy is not sufficient, and waking up the MCU 110 and enable the software to continue running from the point it halted when sufficient power becomes available.

It should be noted that the particular architecture shown in FIG. 1 is merely an example and that other architectures may be equally utilized without departing from the scope of the disclosure. In particular, the techniques for energy-aware computing disclosed herein may be implemented for computing systems other than SoCs such as shown in FIG. 1.

Figure 2:
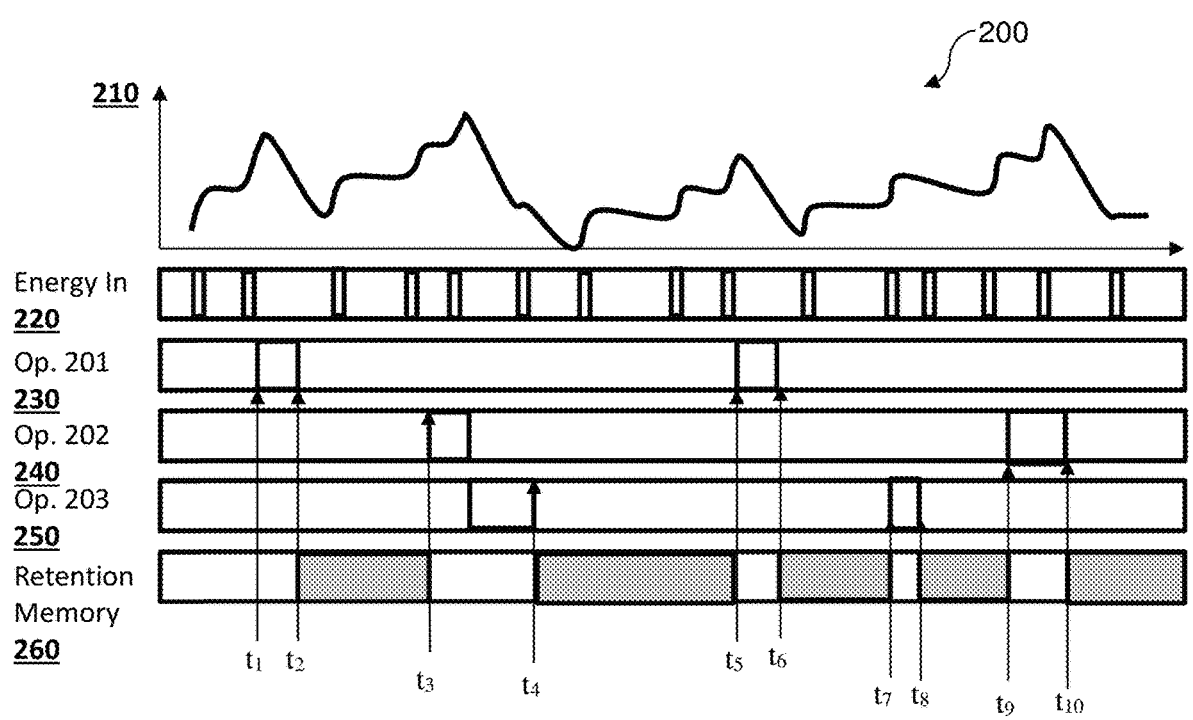
FIG. 2 is an example simulation illustrating execution cycles of an energy-aware computing system designed according to the disclosed embodiments.

FIG. 2 is an example simulation 200 illustrating the execution cycles of an energy-aware computing system designed according to the disclosed embodiments. In the example simulation 200, three atomic operations 201, 202, and 203 are to be performed.

The graph 210 demonstrates the energy level at the energy storage 120 (FIG. 1). The energy level in the storage 120 changes over time and increases as energy from external sources is received and harvested. The energy reception is demonstrated in graph 220.

The first execution cycle starts at '$t_1$' and ends at '$t_2$', where operation 201 is executed (see graph 230). The results of operation 201 are then written to the retention memory 140 (see graph 260). The second execution cycle starts at '$t_3$' and ends at '$t_4$', where operations 202 and 203 are executed (see graphs 240 and 250). Then, the results of operations 202 and 203 are written to the retention memory 140 (see graph 260).

The next execution cycle starts at '$t_5$' and ends at '$t_6$', where operation 201 is executed (see graph 230). Again, the results of operation 201 are written to the retention memory 140 (see graph 260). The next execution cycle starts at '$t_7$' and ends at '$t_8$', where operation 203 is executed (see graph 250). Again, the results of operation 203 are written to the retention memory 140 (see graph 260). The next execution cycle starts at '$t_9$' and ends at '$t_{10}$', where operation 202 is executed (see graph 240). Then, the results of operation 203 are written to the retention memory 140 (see graph 260). This type of "wave" processing continues at the pace of the energy input.

As demonstrated the duration of an execution cycle may differ from one cycle to another. Further, in each execution cycle one or more operations, processes, or sub-processed can be executed, as long as there is sufficient energy available.

In an embodiment, a number of trigger signals are utilized to schedule execution. Such trigger signals may include, $V_{START}$, $V_{STOP}$, a wake-up event, a timeout event. The $V_{START}$ signal defines a voltage level at the energy storage 120 to start an operation. The $V_{STOP}$ signal defines a minimum voltage level at the energy storage 120 to end an operation. The $V_{STOP}$ may be also triggered when there is no sufficient energy to start a task.

In one embodiment, the $V_{START}$ and $V_{STOP}$ signals may be set to respective predefined values. In another embodiment, the $V_{START}$ and $V_{STOP}$ signals are dynamically adjusted. Specifically, the $V_{START}$ may be set to an initial value. If the voltage level at the energy storage 120 is above the $V_{START}$ initial value and the operation starts and immediately stops (upon receiving $V_{STOP}$ trigger), the $V_{START}$ is increased by a predefined delta value. If an execution cycle is completed and no timeout signal is received, the $V_{START}$ is decreased by a predefined delta value. The $V_{STOP}$ value is adjusted in a similar manner. It should be noted that the delta values may be different for the $V_{START}$ and $V_{STOP}$ signals. It should be also noted that each $V_{START}$ and $V_{STOP}$ signals may be different or the same for each of the operations. In an embodiment, the $V_{STOP}$ is set to a voltage value allowing to write to the retention memory 140 after completion of execution.

A wake-up signal is an event that indicates that a specific operation or process should be performed in the next execution cycle. For example, calibration of a transmitter should start upon receiving a wake-up signal. The wake-up signal can be trigged by external events, such as energy detection, constant envelope detection, frequency detection, and the like.

Figure 3:
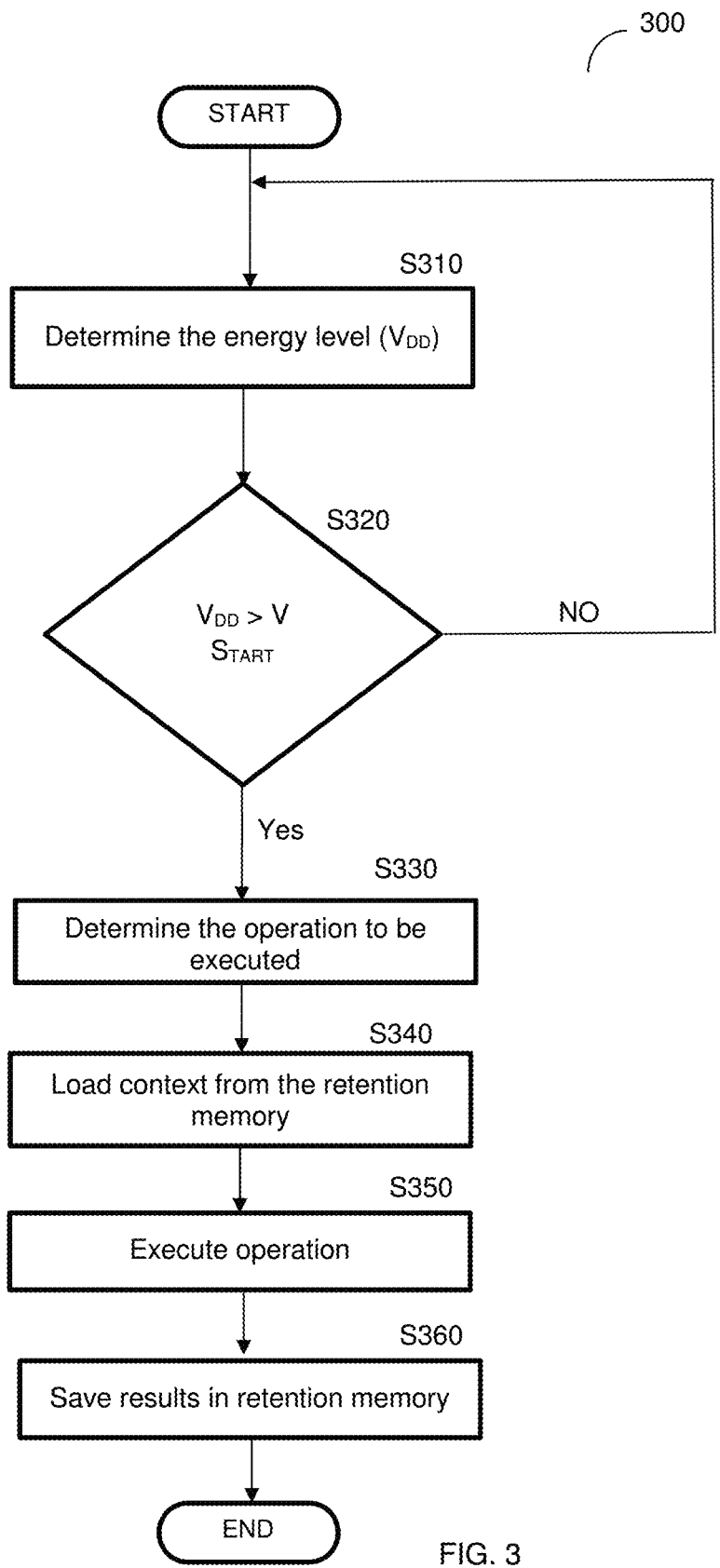
FIG. 3 is a flowchart of a method for scheduling execution of operations in an energy-aware computing system according to an embodiment.

FIG. 3 is an example flowchart 300 of a method for scheduling execution of operations in an energy-aware computing system according to an embodiment. At S310, the power level at the energy storage (e.g., energy storage 120) is determined. This may include sensing or measuring the power level or voltage level at the energy storage.

At S320, the determined power level is compared to a minimum power level required to execute at least one operation. In an example embodiment, S320 may include comparing the voltage level ($V_{DD}$) at the energy storage to a $V_{START}$ signal. The various embodiments to set a value of the $V_{START}$ signal are discussed above. If S320 results with a Yes answer (there is sufficient energy to execute a process), the method continues with S330; otherwise, execution returns to S310. It should be noted that S310 and S320 can be implemented through a single step, e.g., by using a comparator.

At S330, the operation to be executed is determined. In an example embodiment, the determination may be based on a predefined order of operations that should be performed. The order of operations may be designated in a routine descriptor record (RDR) maintained in the scheduler. That is, such a table indicates in-order operations (defined in the RDRs) to be executed consecutively. Each RDR record lists processor core command to call an operation and a physical address of the operation. The address may be a physical address either in the program memory (120, FIG. 1) or retention memory (140, FIG. 1). Each RDR may further define a power schema index (such as clock frequency and power/clock gating information) and a power voltage level (energy budget required to complete the operation).

At S340, the context and/or state of the operation to be executed is loaded from the memory. The memory may be the program memory and/or retention memory discussed above. Thereafter, the S350, the operation is executed during a current execution cycle. At S360, once the operation completes its execution, the results are saved in the retention memory. Then, execution returns to S310.

It should be noted that the method continues as new energy is harvested. It should be further noted that an operation as discussed with reference to FIG. 3 includes an atomic operation, a process, a sub-process, a routine, and the like.

Figure 4:
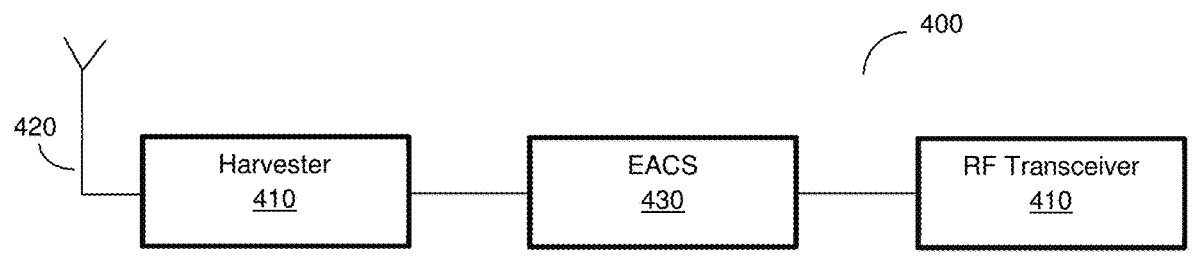
FIG. 4 is a block diagram of a wireless IoT device implementing the energy-aware computing system according to an embodiment.

FIG. 4 is an example block diagram of a wireless IoT device 400 implementing the energy-aware computing system according to an embodiment. The wireless IoT device 400 includes a harvester circuitry 410 coupled to an antenna 420. The harvester circuitry 410 is also coupled to an energy-aware computing system (EACS) 430, and a radio frequency (RF) transceiver 440. The harvester circuitry 410 serves as the power source of the wireless IoT device 400 designed to communicate using a low power communication protocol. Examples for such a protocol includes, but are not limited to, Bluetooth low energy (BLE), Bluetooth®, LoRa, Wi-Gi®, nRF, DECT®, Zigbee®, Z-Wave, EnOcean®, and the like. The IoT device 400 may further include a sensor (not shown). The sensor may be of various types including, but not limited to, temperature, humidity, weight, oxygen, $CO2$, pressure, location, bio-feedback, water, acoustic, light, and so on.

The wireless IoT device 400 can operate at different modes (e.g., scan, sleep, receive, transmit, etc.), each such mode may require a different voltage level to power the EACS 430 and RF transceiver of the wireless IoT device 400. In an embodiment, the harvester circuitry 410 is configured to provide multiple voltage levels to the wireless IoT device 400, while maintaining a low loading DC dissipation value. Specifically, the harvester circuitry 410 may provide multi-level voltage level indications to the EACS 430. These indications allow the EACS 430 (and in particular the scheduler) to determine the state of a voltage supply ($V_{DD}$) at any given moment when the energy storage charges or discharges.

The antenna 420 may be implemented as a receive/transmit antenna of the wireless IoT device 400. That is, in such a configuration, the antenna 420 is primarily designed to receive/transmit wireless signals according to the respective communication protocol of the wireless IoT device 400 (e.g., 2.400-2.4835 GHz signal for BLE). In another embodiment, the antenna 420 may be designed solely for the energy harvesting and operate in a different frequency band, direction, or both, then those defined in the standard of the respective communication protocol. It should be noted that in both configurations, energy can be harvested from any wireless signals received in the air.

The EACS 430 may be implemented and operate as discussed in detail above. That is, the EACS 430 is configured to schedule operations according to the power budget and the available energy. The transceiver 440 is configured to transmit and receive wireless signals under the control of the EACS 430. In an embodiment, the transceiver 440 is a BLE transceiver.

According to some embodiments, the EACS 430 schedules operations in a specify sequential order to allow for proper transmission and reception of packets. An example sequence of operations in a BLE transceiver is now described.

Once sufficient energy has been harvested (e.g., $V_{DD} > V_{START}$), a sensing operation is performed, followed by a BLE packet preparation (e.g., CRC generation, packet whitening). In an embodiment, the preparation is trigger by BLE advertisement packets detected by the IoT device 400. The next operation is encryption of the packet.

Then, the EACS 430 waits for a wake-up event that may be triggered by energy detection, constant envelope detection, or frequency detection of external wireless signals. Such signals may include, for example, a BLE advertisement packet signal, an ultra-wideband (UWB) RFID reader signal in the 900 MHz bands, a 13.56 MHz RFID reader signal, a single tone reference at any of the industrial, scientific and medical (ISM) bands, a modulated reference at any of the ISM bands, and an RF signal in the Wi-Fi spectrum (2.4 GHz or 5 GHz bands). Then, a calibration operation to calibrate the various oscillators in the transceiver 440 is performed. Finally, when there is sufficient energy the packet is transmitted. It should be noted that a timer has to elapse before allowing transmission of the data packets.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An energy-aware system, comprising:
    a microcontroller;
    an energy storage;
    an energy harvester coupled to the energy storage, wherein the energy harvester harvests energy from at least one type of external signal that impinges upon the energy harvester and supplies the harvested energy to the energy storage which stores the harvested energy therein;
    a plurality of execution functions integrated in a system on chip (SoC); and
    a scheduler configured to schedule execution of operations based on available energy at the energy storage and energy required to complete each of the operations.

2. The system of claim 1, further comprising:
    a retention memory configured to maintain data used by the executed operations, wherein the retention memory is continuously powered on.

3. The system of claim 1, wherein each of the operations are executed by any one of: the microcontroller and each of the plurality of execution functions of the SoC.

4. The system of claim 1, wherein each of the execution functions integrated in the SoC operate in a different power domain.

5. The system of claim 1, wherein execution of operation in the SoC powers only a single power domain.

6. The system of claim 1, wherein the scheduler is further configured to:
    determine if a current voltage level at the energy storage is higher than a start voltage level; and
    cause execution of an operation when its start voltage level is lower than or equal to the current voltage level.

7. The system of claim 1, wherein the scheduler is configured to schedule execution of at least one operation during an execution cycle, and wherein during the execution, the available energy at the power storage is sufficient to execute the at least one operation.

8. The system of claim 1, wherein the energy stored in the energy storage is harvested by the energy harvester from over-the-air signals.

9. The system of claim 2, wherein each operation scheduled for execution loads a context from the retention memory and writes result of the execution in the retention memory.

10. The system of claim 3, wherein each operation includes any one of: an atomic operation, a process, a sub-process, and a routine.

11. The system of claim 6, wherein the scheduler is further configured to:
    select an operation for execution based on a predefined order of execution of operations.

12. The system of claim 11, wherein the start voltage level is a minimum required voltage level required to start an operation, and wherein the start voltage level is dynamically adjusted.

13. The system of claim 11, wherein the start voltage level is set differently for different operations.

14. A wireless internet of things (IoT) device, comprising:
    a radio frequent (RF) transceiver;
    an energy harvester, wherein the energy harvester harvests energy from at least one type of external signal that impinges upon the energy harvester and supplies the harvested energy to an energy storage for storage therein; and an energy-aware system configured to schedule execution of operations based on available energy in the energy storage and energy required to complete each of the operations.

15. The wireless IoT device of claim 14, further comprising:
a microcontroller;
the energy storage;
a plurality of execution functions integrated in a system on chip (SoC); and
a scheduler configured to schedule the execution of the operations.

16. A method for operating an energy-aware system, comprising:
determining if a current voltage level at an energy storage included in the energy-aware system is higher than a start voltage level, wherein the energy storage receives energy that it stores from an energy harvester that harvests energy from at least one type of external signal that impinges upon the energy harvester; and
scheduling an execution of at least one operation, by the energy-aware system, when the operation's start voltage level is lower than the current voltage level.

17. The method of claim 16, further comprising:
selecting an operation for execution based on a predefined order of execution of operations.

18. The method of claim 16, wherein the start voltage level is a minimum required voltage level required to start an operation, and wherein the start voltage level is dynamically adjusted.

19. The method of claim 18, wherein the start voltage level is set differently for different operations.

20. The method of claim 16, wherein the scheduling the execution of the operation, further comprises:
scheduling execution of the at least one operation during an execution cycle, and wherein during the execution, the available energy at the power storage is sufficient to execute the at least one operation.

* * * * *